United States Patent
Hsu (10) Patent No.: US 7,878,662 B2
(45) Date of Patent: Feb. 1, 2011

(54) X-PRISM FOR USE IN PROJECTOR

(75) Inventor: Pi-Tsung Hsu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 550 days.

(21) Appl. No.: 12/013,918

(22) Filed: Jan. 14, 2008

(65) Prior Publication Data

US 2009/0051883 A1 Feb. 26, 2009

(30) Foreign Application Priority Data

Aug. 22, 2007 (CN) .................. 2007 1 0201437

(51) Int. Cl.
- *G03B 21/14* (2006.01)
- *G03B 21/00* (2006.01)
- *G03B 21/28* (2006.01)

(52) U.S. Cl. ..................... 353/81; 353/33; 359/638; 359/834

(58) Field of Classification Search ............. 353/30, 353/31, 33, 34, 81; 359/618, 629, 634, 638, 359/639, 640, 831, 833, 834, 836, 837
See application file for complete search history.

(56) References Cited

U.S. PATENT DOCUMENTS

| 5,221,998 | A | * | 6/1993 | Sugahara | 359/831 |
| 5,909,944 | A | * | 6/1999 | Yajima et al. | 353/81 |
| 6,141,150 | A |   | 10/2000 | Ushiyama et al. | |
| 6,327,092 | B1 | * | 12/2001 | Okuyama | 359/634 |
| 6,407,868 | B1 | * | 6/2002 | Ishibashi et al. | 359/634 |
| 6,690,521 | B2 | * | 2/2004 | Hashizume et al. | 359/831 |
| RE39,859 | E | * | 9/2007 | Ushiyama et al. | 359/618 |
| 2009/0051883 | A1 | * | 2/2009 | Hsu | 353/81 |

FOREIGN PATENT DOCUMENTS

| CN | 1236113 A | 11/1999 |
| CN | 1499222 A | 5/2004 |

* cited by examiner

*Primary Examiner*—John R Lee
(74) *Attorney, Agent, or Firm*—Jeffrey T. Knapp (57) ABSTRACT

An x-prism provides four triangular prisms each of which includes a hypotenuse side, a first side surface adjoining the hypotenuse side surface, a second side surface perpendicular to the first side surface, a first end surface and an opposite second end surface, the first and second end surfaces being at opposite sides of each of the triangular prisms, the triangular prisms being attached to each other with the hypotenuse side surfaces thereof facing outward. The four triangular prisms includes at least two triangular prisms with the first end surfaces thereof being coplanar with each other, and at least one triangular prism with the first end surface thereof being non-coplanar with the first end surfaces of the other triangular prisms.

6 Claims, 8 Drawing Sheets

X-PRISM FOR USE IN PROJECTOR

FIELD OF THE INVENTION

The present invention relates to an optical device, and more particular to an x-prism and method for orientation thereof.

BACKGROUND

In projector technology, x-prisms are typically used to combine red, green, and blue light into a full composite image.

Figure 6:
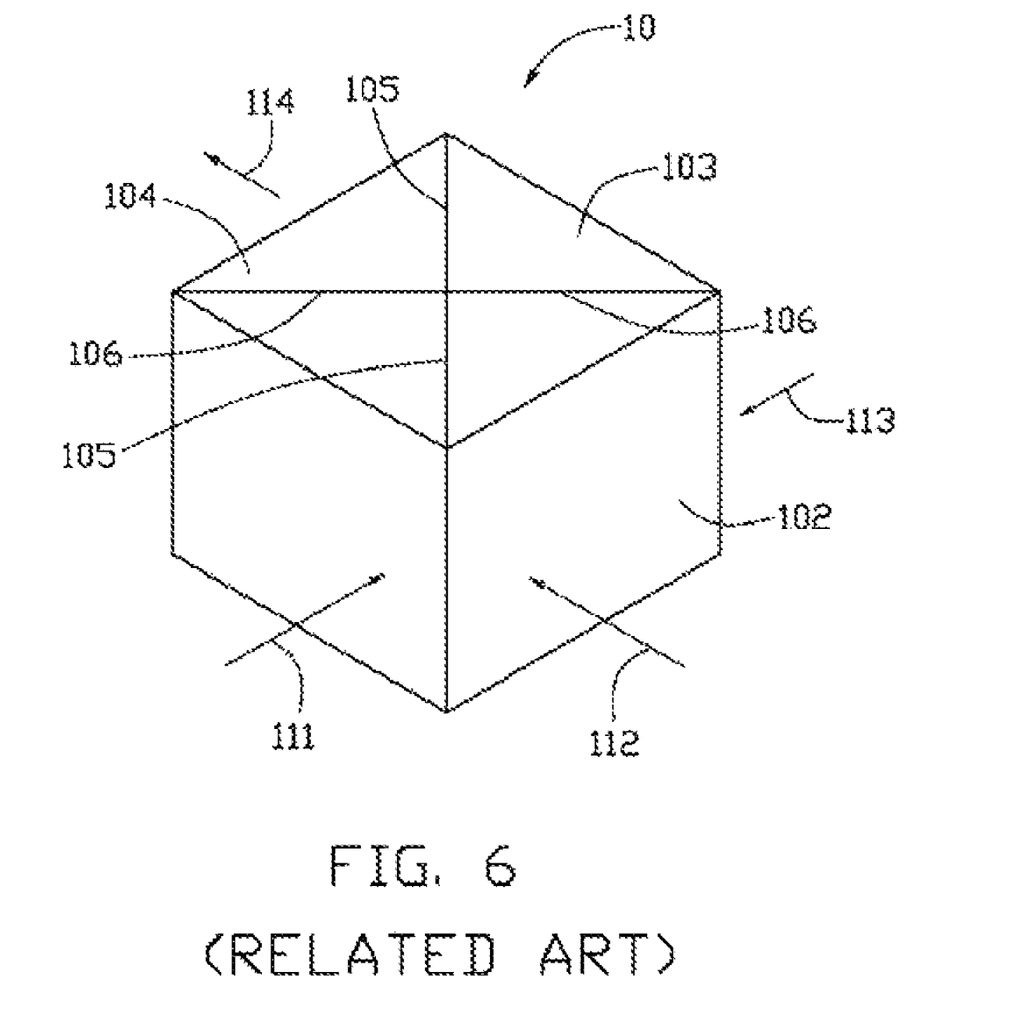
FIG. 6 is a perspective view of an x-prism of a prior art.
Figure 7:
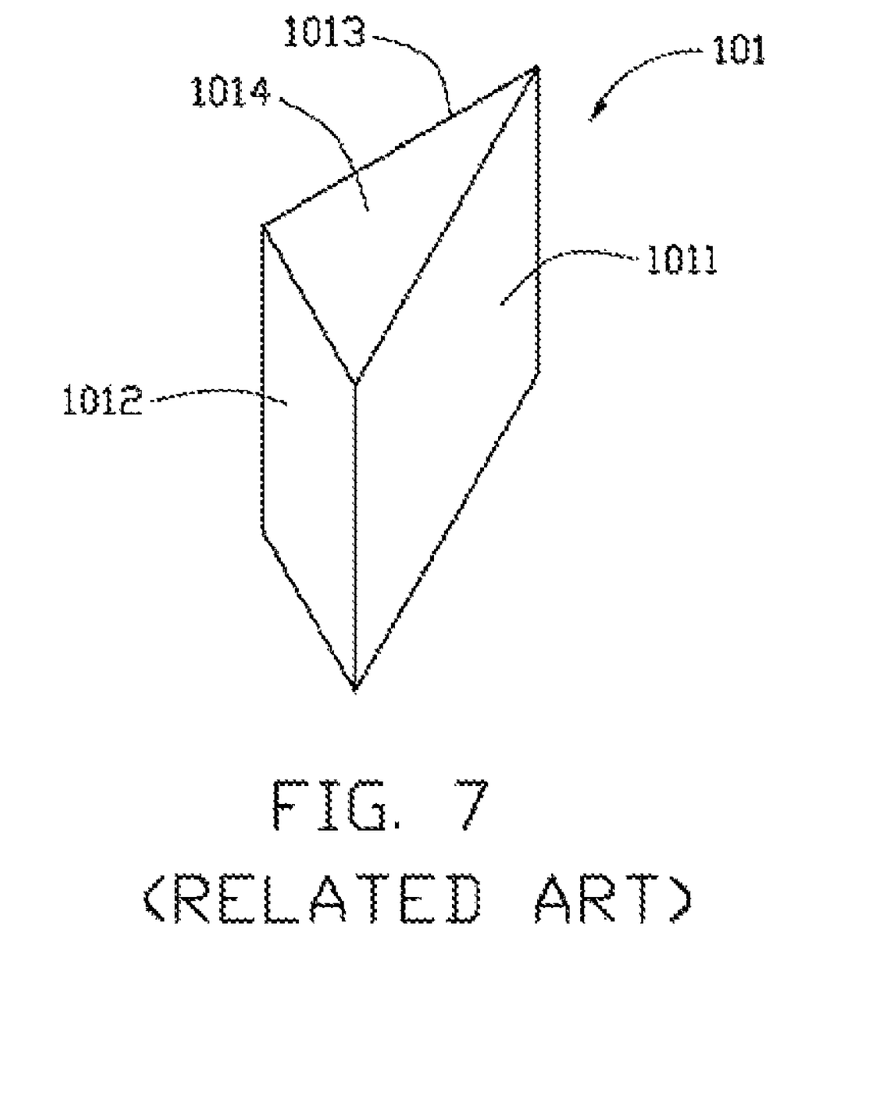
FIG. 7 is a perspective view of a triangular prism of the x-prism of FIG. 6.

Referring to FIGS. 6-7, an x-prism 10 is composed of a first triangular prism 101, a second triangular prism 102, a third triangular prism 103, and a fourth triangular prism 104. Each of the triangular prisms has a same configuration, and a same right-angle formed therebetween. The first triangular prism 101 provides a hypotenuse side 1011, a first side 1012, a second side 1013 perpendicular to the first side 1012, and a polished side 1014. The hypotenuse side 1011 is connected to the first side 1012 and the second side 1013. The polished side 1014 is adjoining the hypotenuse side 1011, the first side 1012, and the second side 1013. The first triangular prisms 101, the second triangular prism 102, the third triangular prism 103, and the fourth triangular prism 104 are closely adhered each other via adhering the corresponding rectangular sides thereof, thereby the x-prism 10 is formed.

When different color lights are transmitted through the x-prism 10, such as a red incident light 111 transmitting through the hypotenuse side 1011 of the triangular prism 101, a green incident light 112 transmitting through the corresponding hypotenuse side of the triangular prism 102, and a blue incident light 113 transmitting through the corresponding hypotenuse side of the triangular prism 103, they are combined to form a full composite image emitted from the corresponding hypotenuse side of the triangular prism 104. Moreover, the first side 1012 and the second side 1013 of the triangular prism 101 respectively provides a first coating 106 and a second coating 105 with different properties from the first coating 106. The second coating 105 allows any color incident light except the red incident light 111 to transmit through the x-prism 10, and the first coating 106 allows any color light except the blue incident light 113 to transmit through the x-prism 10. The corresponding first and second sides of one of the second triangular prism 102, the third triangular prism 103, and the fourth triangular prism 104 also respectively provides different coatings with different properties.

The x-prism 10 provides the polished sides as an orientation base for configuring the x-prism 10 to the projector. The polished sides of the x-prism 10 are assembled to the projector by adhesives. In a high-temperature environment, the adhesive bond between the x-prism and the projector may weaken and cause a shifting of position of the triangular prisms of the x-prism device, negatively affecting image resolution.

SUMMARY

An x-prism provides four triangular prisms each of which includes a hypotenuse side, a first side surface adjoining the hypotenuse side surface, a second side surface perpendicular to the first side surface, a first end surface and an opposite second end surface, the first and second end surfaces being at opposite sides of each of the triangular prisms, the triangular prisms being attached to each other with the hypotenuse side surfaces thereof facing outward. The four triangular prisms includes at least two triangular prisms with the first end surfaces thereof being coplanar with each other, and at least one triangular prism with the first end surface thereof being non-coplanar with the first end surfaces of the other triangular prisms.

BRIEF DESCRIPTION OF THE DRAWINGS

Many aspects of the present x-prism can be better understood with reference to the following drawings. The components in the drawings are not necessarily drawn to scale, the emphasis instead being placed upon clearly illustrating the principles of the present x-prism device. Moreover, in the drawings, like reference numerals designate corresponding parts throughout the several views.

DETAILED DESCRIPTION OF THE PREFERRED EMBODIMENTS

Embodiments of the present x-prism will now be described in detail below and with reference to the drawings.

Figure 1A:
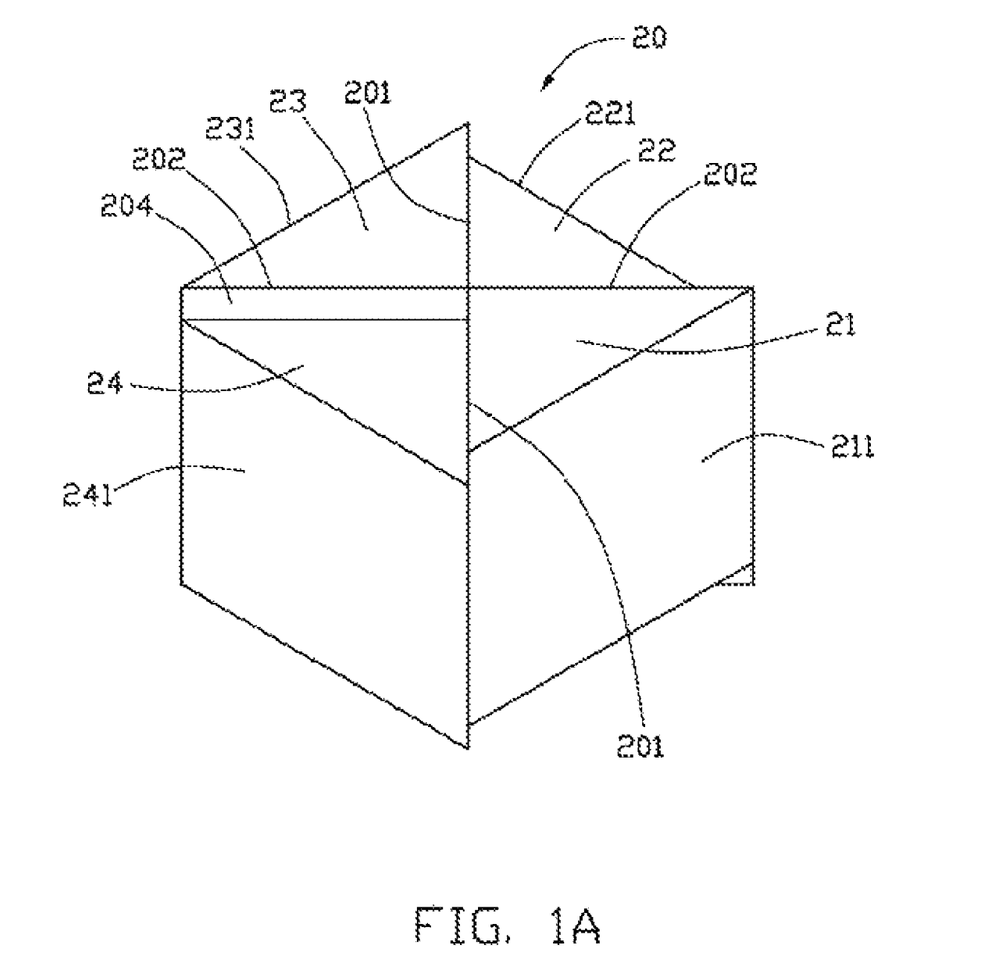
FIG. 1A is a perspective view of an x-prism according to a first embodiment of the invention.
Figure 1B:
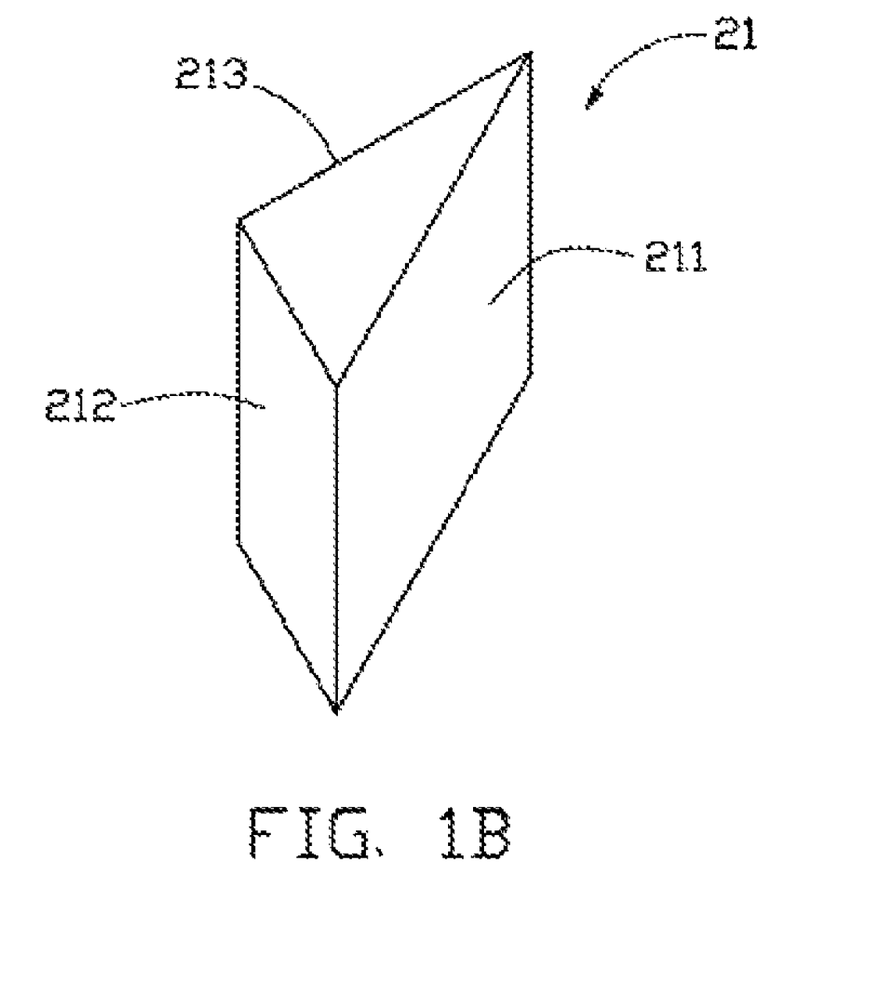
FIG. 1B is a perspective view of a triangular prism of the x-prism shown in FIG. 1A.

Referring to FIG. 1A and FIG. 1B, an x-prism 20 provides a first triangular prism 21, a second triangular prism 22, a third triangular prism 23, and a fourth triangular prism 24 respectively having a first hypotenuse side 211, a second hypotenuse side 221, a third hypotenuse side 231, a fourth hypotenuse side 241 as four lateral sides of the x-prism 20. The first triangular prism 21 is formed opposite to the third triangular prism 23, and the second triangular prism 22 is formed opposite to the fourth triangular prism 24. The first triangular prism 21 includes the first hypotenuse side 211, a first side 212, and a second side 213. The structure of the second triangular prism 22, the third triangular prism 23, and the fourth triangular prism 24 are identical to the first triangular prism 21. The first side 212 and the second side 213 of the first triangular prism 21 respectively provides a first coating 201 and a second coating 202. The first coating 201 is different from the second coating 202. In the first embodiment, the first coating 201 will only reflect a red incident light, and the second coating 202 will only reflect a blue incident light. The second triangular prism 22 adjacent to the first triangular prism 21 of the x-prism 20 provides the first coating 201 adhered to the first coating 201 of the third triangular prism 23 and the second coating 202 adhered to the second coating 202 of the first triangular prism 21. In this embodiment, the adjacent triangular prisms have the same coatings. The first triangular prism 21 and the third triangular prism 23 are shifted upwardly to be offset from the second and fourth prisms 22, 24, thereby defining two spaces 204 bounded by the resulting exposed side surface portions of the first and third triangular prisms 21, 23 and the top surfaces of the second triangular prism 22 and the fourth triangular prism 24 of the x-prism 20. It is to be noted that this configuration also creates spaces (not labeled) at the bottom of the x-prism 20 but they need not be utilized to perform any function in the present embodiment or may be utilized in a same manner as the spaces 204. The contacting surfaces of the first~fourth triangular prism 21~24 are adhered together firmly fixing the x-prism 20 in the present configuration. Furthermore, the x-prism 20 is oriented in relation to a projector (not shown) such that at least one of the spaces 204 is set as an orientation base for assembling the x-prism 20 to the projector. Moreover, the at least one space 204 is received in the projector for enhancing orientation accuracy, fixity, and intensity.

Figure 2:
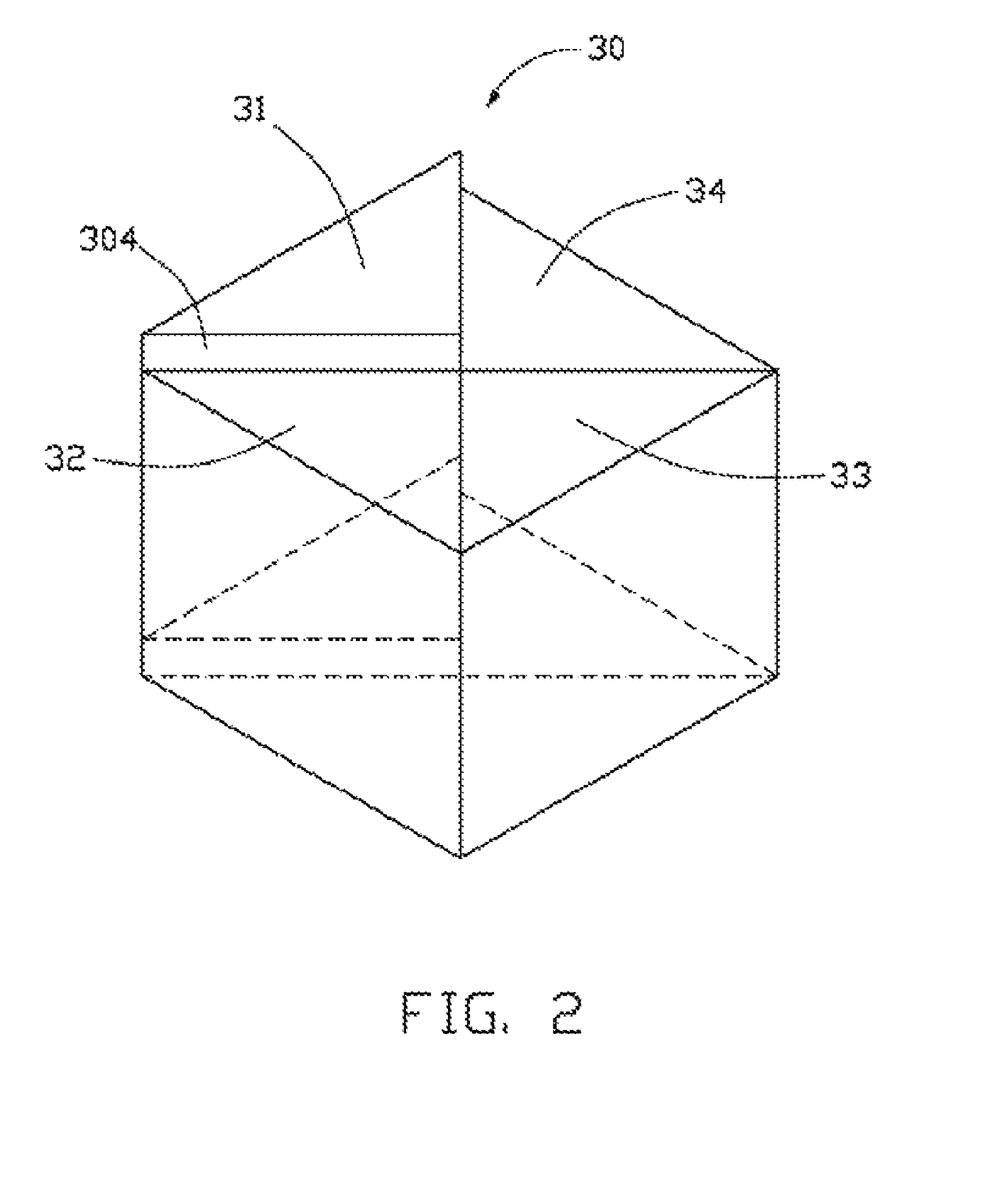
FIG. 2 is a perspective view of an x-prism according to a second embodiment of the invention.

FIG. 2 is a perspective view of an x-prism 30 according to a second embodiment. The x-prism 30 includes a first triangular prism 31, a second triangular prism 32, a third triangular prism 33, and a fourth triangular prism 34. The x-prism 30 is similar to the x-prism 20 of the first embodiment. A difference being that only the first triangular prism 31 is shifted upwardly to be offset from the second~fourth prisms 32-34 leaving a space 304 bounded by the resulting exposed side portions of the first prism 31 and the top surfaces of the second~fourth prisms 32-34. Other aspects of the second embodiment are the same as that of the first embodiment, and so are not described in detail.

Figure 3:
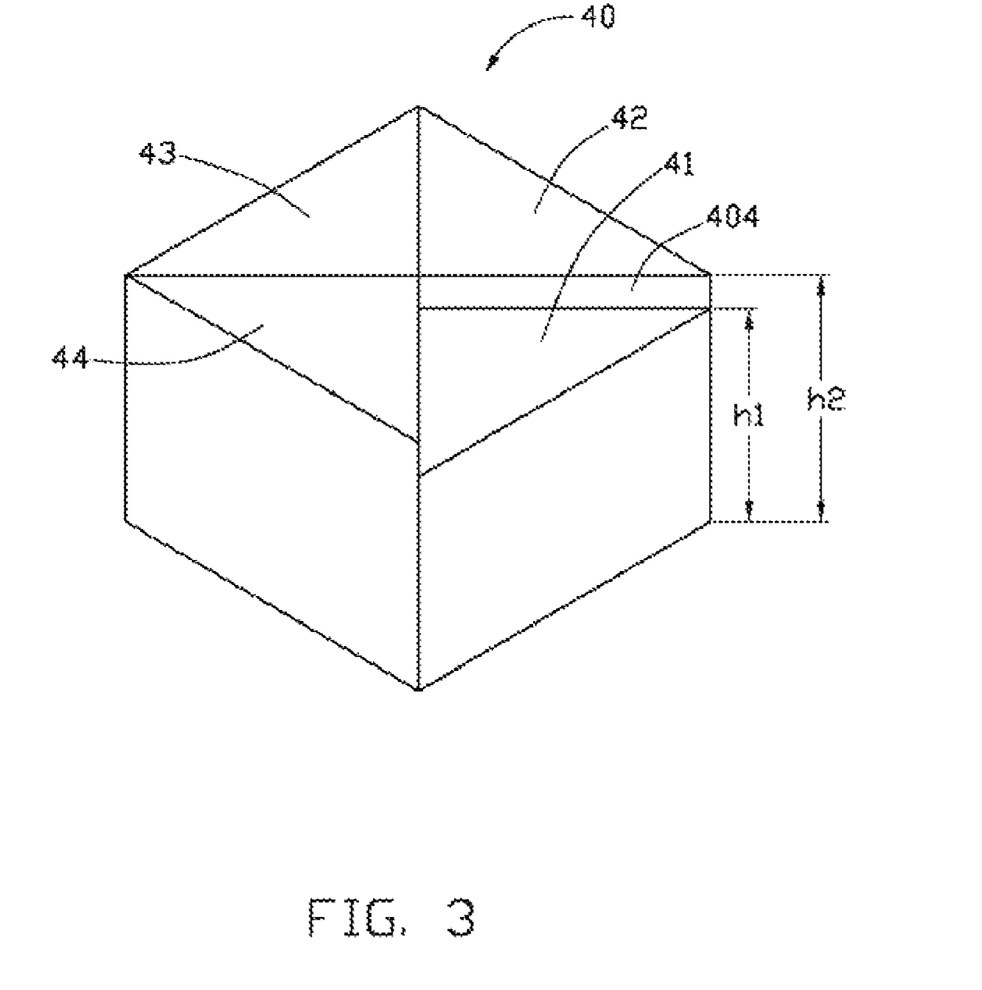
FIG. 3 is a perspective view of an x-prism according to a third embodiment of the invention.

FIG. 3 is a perspective view of an x-prism 40 according to a third embodiment. The x-prism 40 includes a first triangular prism 41, a second triangular prism 42, a third triangular prism 43, and a fourth triangular prism 44. The x-prism 40 is similar to the x-prism 30 of the second embodiment. The difference is a height h1 of the first triangular prism 41 is less than a height h2 of prisms 42-44. Thus defining a space 404 at the top of the x-prism 40 bounded by exposed side surfaces of the second~fourth prisms 42-44 and the top surface of the first prism 41, but leaving the bottom surfaces of the prisms 41-44 flush with each other. Other aspects of the third embodiment are the same as that of the second embodiment, and so are not described in detail.

Figure 4:
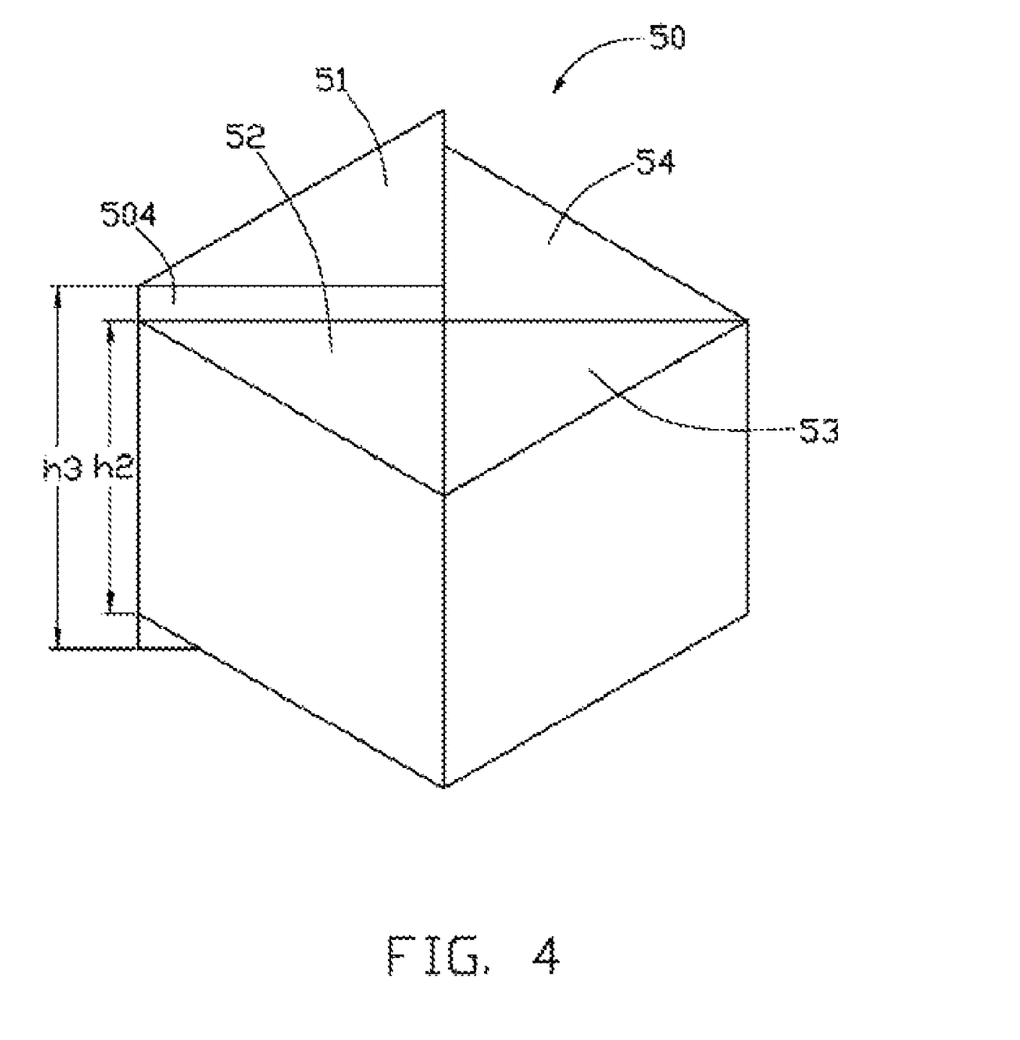
FIG. 4 is a perspective view of an x-prism according to a fourth embodiment of the invention.

FIG. 4 is a perspective view of an x-prism 50 according to a fourth embodiment. The x-prism 50 includes a first triangular prism 51, a second triangular prism 52, a third triangular prism 53, and a fourth triangular prism 54. The x-prism 50 is similar to the x-prism 40. The difference being that the height h3 of the first triangular prism 51 is greater than the height h2 of the second~fourth prisms 52-54 thereby defining a space 504 having a same shape as the space 304 of second embodiment. Other aspects of the fourth embodiment are the same as that of the third embodiment, and so are not described in detail. In other embodiments the offsetting of surfaces of triangular prisms of an x-prism may be accomplished by other configurations and are not limited to those described above.

Figure 5:
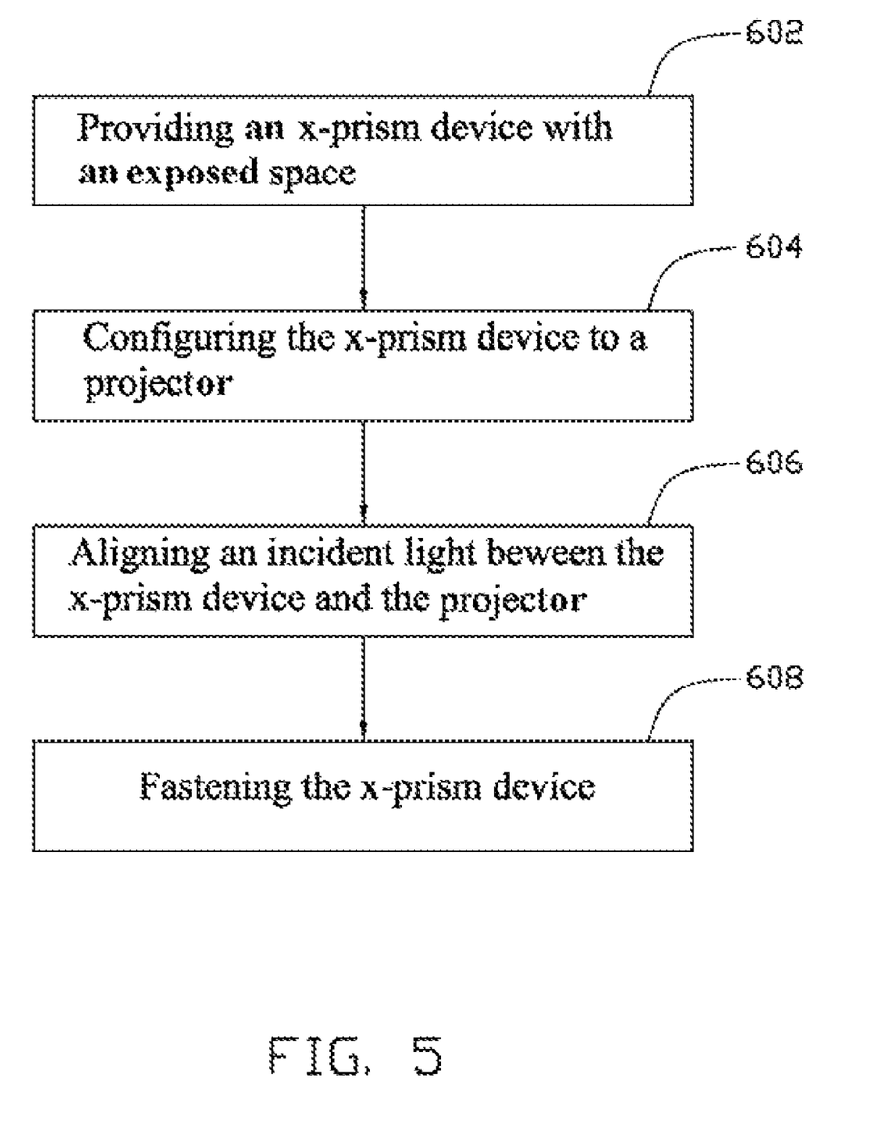
FIG. 5 is a flowchart of an orientation method for assembling the x-prism of FIG. 1A.

FIG. 5 is a flowchart of an orientation method for assembling the x-prism according to the first embodiment. S602, an x-prism 20 is provided with the space 204. S604, the x-prism is configured to the projector. Step 606, an incident light is aligned between the x-prism 20 and the projector by utilizing the space 204 to provide a path for incident light to use the exposed side surface of the third triangular prism 23 as an orientation base, and an angle of the incident light is aligned by adjusting a position of the incident light. Step 608, the x-prism 20 is fixed in or to a projector by adhering the bounding surfaces of the space 204 thereto.

Compared to the related art, it is shown that the modified x-prism of the embodiment avoids the difference in an angle deviation using a polished face as an orientation base, and provides the exposed surfaces to the projector for raising orientation accuracy, fixity, and intensity.

It will be understood that the above particular embodiments are described and shown in the drawings by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. An x-prism comprising:
    four triangular prisms, each of the triangular prisms comprising a hypotenuse side surface, a first side surface adjoining the hypotenuse side surface, a second side surface perpendicular to the first side surface, a first end surface and an opposite second end surface, the first and second end surfaces being at opposite sides of each of the triangular prisms, the triangular prisms being attached to each other with the hypotenuse side surfaces thereof facing outward; and
    wherein the four triangular prisms includes at least two triangular prisms with the first end surfaces thereof being coplanar with each other, and at least one triangular prism with the first end surface thereof being non-coplanar with the first end surfaces of the other triangular prisms.

2. The x-prism as claimed in claim 1, wherein the second end surfaces of the four triangular prisms are coplanar with each other.

3. The x-prism as claimed in claim 1, wherein the first end surface of the at least one triangular prism is raised relative to the first end surfaces of the other triangular prisms.

4. The x-prism as claimed in claim 1, wherein the first end surface of the at least one triangular prism is depressed relative to the first end surfaces of the other triangular prisms.

5. The x-prism as claimed in claim 1, wherein the height of the at least one triangular prism is less than that of the other triangular prisms.

6. The x-prism as claimed in claim 1, wherein the height of the at least one of the four triangular prisms is larger than that of the other triangular prisms.

* * * * *